United States Patent [19]
Owen

[11] Patent Number: 5,302,782
[45] Date of Patent: Apr. 12, 1994

[54] THREE-COMPONENT BOREHOLE WALL-LOCKING SEISMIC DETECTOR

[75] Inventor: Thomas E. Owen, Helotes, Tex.

[73] Assignee: Southwest Research Institute, San Antonio, Tex.

[21] Appl. No.: 139,222

[22] Filed: Oct. 19, 1993

Related U.S. Application Data

[63] Continuation-in-part of Ser. No. 898,298, Jun. 15, 1992, abandoned.

[51] Int. Cl.$^5$ .............................................. G01V 1/40
[52] U.S. Cl. ................................. 181/122; 181/401; 181/104
[58] Field of Search .......................... 367/25, 86, 911; 181/102, 104, 106, 122, 401; 73/151, 152

[56] References Cited

U.S. PATENT DOCUMENTS

| | | | |
|---|---|---|---|
| 3,614,891 | 3/1969 | Nolte | 73/151 |
| 4,534,020 | 8/1985 | O'Brien | 181/401 |
| 4,702,343 | 10/1987 | Paulsson | 181/106 |
| 4,715,470 | 12/1987 | Paulsson | 181/106 |
| 4,845,990 | 7/1989 | Kitzinger et al. | 73/597 |
| 4,923,030 | 5/1990 | Meynier | 181/106 |
| 5,027,918 | 7/1991 | Cole | 181/102 |
| 5,060,751 | 10/1991 | Kuhlman et al. | 181/102 |

Primary Examiner—Ian J. Lobo
Attorney, Agent, or Firm—Gunn, Lee & Miller

[57] ABSTRACT

A seismic detector for boreholes is described that has an accelerometer sensor block for sensing vibrations in geologic formations of the earth. The density of the seismic detector is approximately matched to the density of the formations in which the detector is utilized. A simple compass is used to orient the seismic detector. A large surface area shoe having a radius approximately equal to the radius of the borehole in which the seismic detector is located may be pushed against the side of the borehole by actuating cylinders contained in the seismic detector. Hydraulic drive of the cylinders is provided external to the detector. By using the large surface area wall-locking shoe, force holding the seismic detector in place is distributed over a larger area of the borehole wall thereby eliminating concentrated stresses. Borehole wall-locking forces up to ten times the weight of the seismic detector can be applied thereby ensuring maximum detection frequency response up to 2,000 hertz using accelerometer sensors in a triaxial array within the seismic detector.

10 Claims, 3 Drawing Sheets

THREE-COMPONENT BOREHOLE WALL-LOCKING SEISMIC DETECTOR

GOVERNMENT CONTRACT

This invention was made with government support under contract No. DE-AC22-89DC14473 awarded by the Department of Energy. The government has certain rights in this invention.

This application is a continuation-in-part of patent application Ser. No. 07/898,298 filed on Jun. 15, 1992 now abandoned.

FIELD OF THE INVENTION

This invention relates to borehole wall-locking seismic more specifically, a seismic detector that is matched in density to the density of the formation and can be held in place by a maximum force-to-weight ratio with a minimum of concentrated stresses.

CROSS REFERENCE TO RELATED PATENTS

This application is a continuation-in-part patent application from U.S. patent application Ser. No. 07/898,298 filed on Jun. 15, 1992, having the same title, inventor, and assignee. With the filing of this application, Ser. No. 07/898,298 filed on Jun. 15, 1992, has been abandoned.

BACKGROUND OF THE INVENTION

In the oil and gas industry, numerous techniques of determining the geological structure of formations in the earth have been developed. One of the most common techniques is called "vertical seismic profiling" (VSP). This method is used to obtain information concerning a formation of interest. Typically, this technique requires the lowering of a geophone into a wellbore while providing at the surface seismic energy sources such as a dynamite charge. The explosion of the dynamite charge creates a seismic wave which is detected by the geophone located in the wellbore.

Another technique that is used is reverse vertical seismic profiling (RVSP) where numerous geophones are located on the surface and a dynamite charge or other energy source is activated in the borehole. By using these types of well known methods, subterranean formations can be probed with seismic waves to delineate their structure and physical properties. These conventional VSP and RVSP methods typically operate using seismic waves in the frequency range of 10-200 hertz and are capable of resolving structural details having dimensions of about 15-20 meters or larger.

In order to obtain improved resolution of underground geologic structures, the VSP and RVSP methods must be capable of operating at seismic wave frequencies up to about one order of magnitude higher than the conventional methods. However, one of the common problems with conventional seismic detectors is that their low-frequency design attributes are inappropriate for high-frequency measurements up to 2,000 hertz. To detect frequencies over the entire range, the seismic detector needs to be approximately the same density as the formation being measured and must be held in place in such a manner that it appears to be part of the formation itself. Some examples of seismic borehole devices can be found in U.S. Pat. No. 4,845,990 to Kitzinger, U.S. Pat. No. 4,715,470 to Paulsson, and U.S. Pat. No. 4,702,343 to Paulsson. However, the devices as described in each of these patents are not suitable for operating over a frequency range of 200 to 2,000 hertz because the devices are considerably heavier than the mass density of the geological formations in which they must operate. For such a heavy device to be held in position by the formation, the borehole clamping mechanism causes concentrated stresses at the points of contact with the geological formation. Concentrated stresses impose borehole resonance effects which distort the signal being received.

It is also important to know the azimuthal orientation of the seismic waves being detected. None of the patents described have an azimuthal orientation means for determining the direction from which the signal may originate. Directional orientation has been used in other types of downhole devices such as shown in U.S. Pat. No. 4,923,030 to Meynier and U.S. Pat. No. 3,614,891 to Nolte. However, neither of these devices pertain to probes intended to be oriented first and then clamped into place in a borehole for seismic detection.

High resolution seismic measurements have been used in characterizing the physical properties of rock, geological structure, and fluid migration pathways in oil and gas reservoirs by using seismic source and detector devices capable of operating over the frequency range of 200 to 2,000 hertz. Several seismic source transducers designed for borehole operation are available for this high resolution application. For example, borehole hydrophones have been used as detectors because of their useable frequency response up to 2,000 hertz and higher. Hydrophones generally provide a wideband frequency response to the incident seismic waves, but, because of the indirect nature of their response (i.e. scalar-pressure response to motional displacements of the borehole wall), the output signal does not contain information on the vector seismic displacement of the formation the borehole.

An important requirement in seismic characterization of oil and gas reservoirs is to detect and resolve the direction of the propagating wavefronts of both compressional and shear waves arriving at the detector. In the case of shear waves, the polarization orientation of the detected shear waves must be resolved. Hydrophone detectors, although indirectly responsive to incident shear waves, are not capable of providing a quantitative response indicating the vector of the seismic wavefront or the polarization of the shear wave motional displacements. Therefore, a seismic detector capable of accurately and directly sensing the three-dimensional motional displacement of the borehole wall is needed. The requirements for this type of seismic detector may be met by the use of three vector type sensors such as geophones or accelerometers aligned along orthogonal axes and mounted in a rigid borehole probe which can be temporarily clamped into place. This will allow the detector to be responsive to the three-dimensional seismic motions of the drilled formation.

Previous forms of borehole wall-locking seismic detector probes have consisted of a combination of one or more seismic detector elements; typically velocity sensitive geophones combined with one or more clamping arms which serve to hold the probe against the borehole wall for measurements. The clamping arms may be electrically or hydraulically driven. These types of probes have been relatively heavy, consisting of a pressure-resistant housing and a high-force mechanical clamping mechanism. In these prior devices, their inertial mass and self-contained compliant locking arm comprise a resonant structure that has prevented their use as three-component seismic detectors at frequencies above about 300 hertz. This creates spurious transverse resonances at frequencies above about 300 hertz, depending upon the particular design characteristics of the detector under consideration. Moreover, the geophone detector elements widely used for such seismic measurements typically exhibit a transverse (cross-axis) sensitivity in the range of 10–15 percent of the primary axis sensitivity.

Smaller and lighter weight borehole wall-locking seismic detectors are needed to overcome these limitations and to provide three-component seismic measurements for high resolution applications primarily in the frequency range of 200 to 2,000 hertz.

SUMMARY OF THE INVENTION

It is an object of the present invention to provide a three-component borehole wall-locking seismic detector capable of operating over a frequency range of 200 to 2,000 hertz.

It is a further object of the present invention to resolve the polarization orientation and direction of propagation of compressional and shear waves received by the seismic detector.

It is another object of the present invention to provide a borehole wall-locking seismic detector that will have an average density which is approximately the same as the geological material in which it is to be clamped.

It is even another object of the present invention to provide a substantial locking force of as much as ten times the weight of the seismic detector to temporarily clamp the detector into position for accurately sensing the motional displacements of the geological formation.

It is yet another object of the present invention to distribute the locking forces of the detector over a large surface area of the borehole wall thereby reducing high-pressure contact with the geological formation to minimize the possibility of imposing excessive stresses which could result in fracture failure of the borehole wall and loss of coupling.

It is still another object of the present invention to provide a shoe that has a radius approximately equal to the radius of the borehole being measured and covers an annular sector of the borehole circumference of approximately 120 degrees, which shoe is forced outward to contact the walls of the borehole by pressure-activated cylinders located inside of the detector, which cylinders may be reversed to retract the shoe and release the detector.

Still another object of the present invention is to provide a method of orienting the detector so that the azimuth orientation can be determined when the detector is suspended in the borehole. By having the angular position of the probe determined, the azimuth direction of the vibrational signals can also be determined.

These and other objects of the invention can be accomplished by building a seismic detector of preselected materials so that the weight of the detector assembly is approximately the same density as the geological formations in which it is to be located; typically about 2.5 times the density of water. An accelerometer block is located within the detector that will sense vibrations along three orthogonal axes. A shoe that extends substantially the entire length of the detector is located on one side of the detector. Rods connect the shoe to internal cylinders within the detector. Because the radius of the shoe is approximately the same radius as the borehole and covers approximately 120 degrees, when the shoe is pressed into engagement with the borehole wall by activating the cylinders, the shoe is pressed against a large surface area of the borehole. Because of the lightweight nature of the detector and the large surface area of the shoe, a very low clamping pressure is applied to the borehole wall; yet, the ratio of the retaining force to the weight of the detector assembly is very large typically about ten to one.

The pressure-activated cylinders that are used to press the shoe against the borehole wall may be activated by any of a number of sources. For example, by pressurizing the sealed internal volume of the detector with air, an air pressure "spring" will be provided which will force the cylinder back into its rest state, thereby pulling the shoe back against the detector and releasing the clamped detector from the geological formation.

To insure proper orientation of the detector, an orientation device such as a compass is contained in the detector. By use of a light-sensitive device, when the needle of the compass passes through that light-sensitive device, a signal will be generated. By pre-setting the angle relative to the accelerometer sensor coordinate axis at which the light-sensitive device will be interrupted, the detector can be placed in the borehole and then turned until the proper orientation of the detector is obtained as indicated by the light-sensitive device output signal. The turning of the detector in the borehole can be accomplished by means of a torque-rigid hose which delivers the hydraulic fluid to the cylinders.

DESCRIPTION OF THE PREFERRED EMBODIMENT

Figure 1:
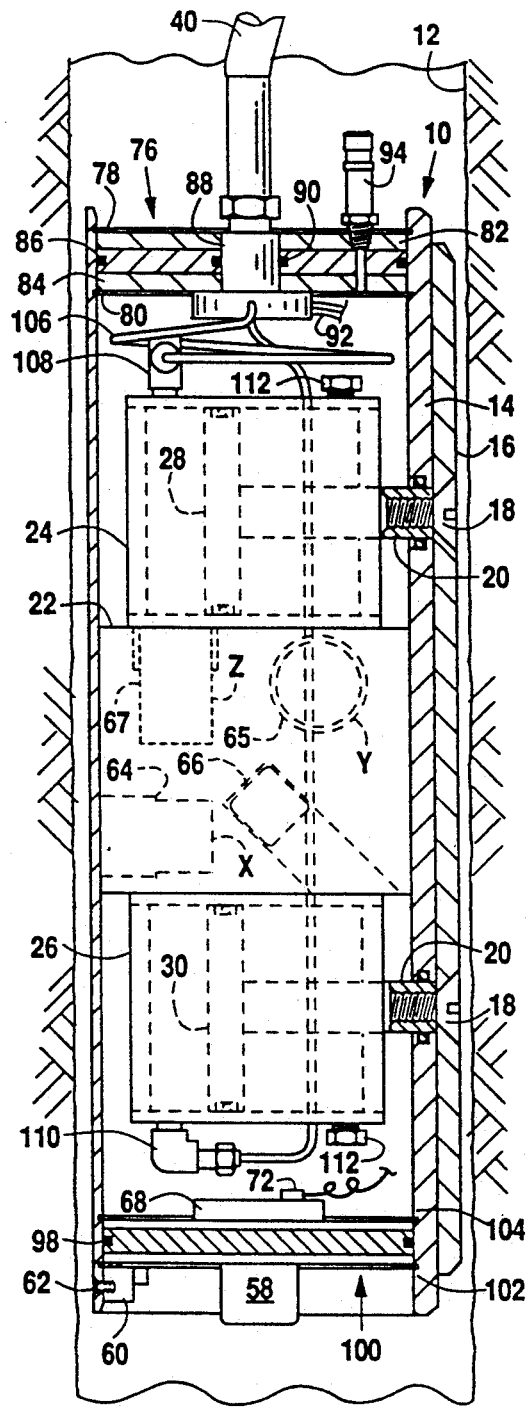
FIG. 1 is a longitudinal, partial cross-sectional view of a three-component borehole wall-locking seismic detector showing the wall-locking shoe retracted.
Figure 2:
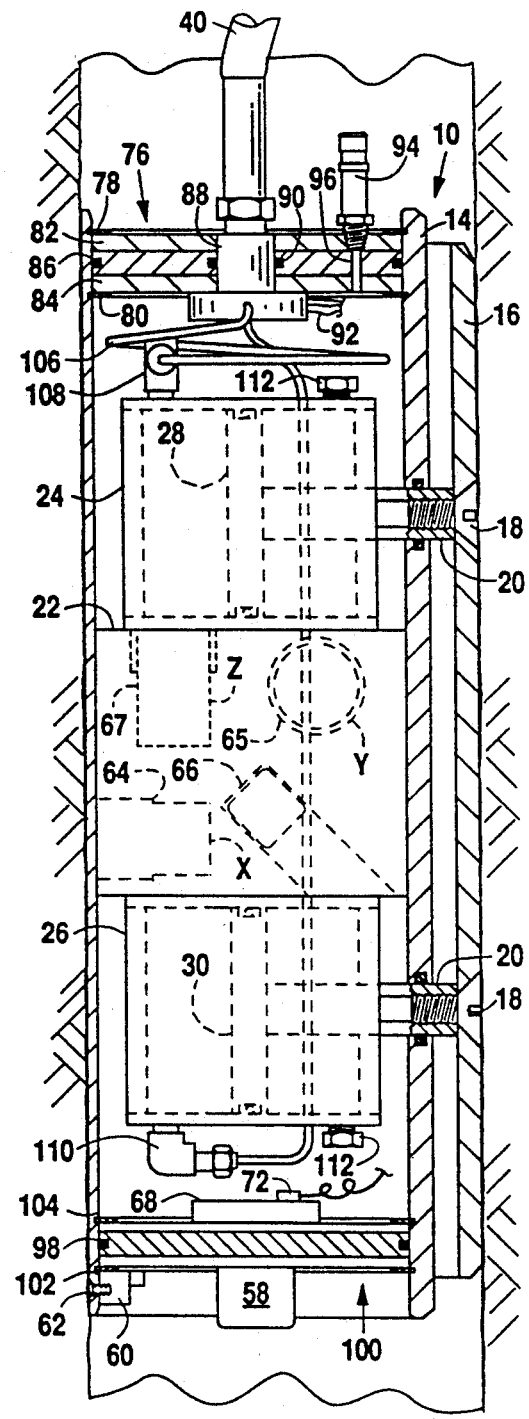
FIG. 2 is a longitudinal, partial cross-sectional view of a three-component borehole wall-locking seismic detector with the shoe extended to lock the probe in the borehole.

Referring to FIGS. 1 and 2 of the drawings, a three-component borehole wall-locking seismic detector is contained within borehole 12 in the earth's surface. The seismic detector 10 has a cylindrical case 14 with a shoe 16 mounted on one side of the cylindrical case 14 by screws 18 attached to piston rods 20.

Contained within the cylindrical case 14 is a standard accelerometer block 22 commonly used in seismic detection work. The accelerometer block 22 is rigidly mounted to the cylindrical case 14. Mounted above and below the accelerometer block 22 are hydraulic cylinders 24 and 26, which cylinders have their respective piston rods 20.

Figure 3:
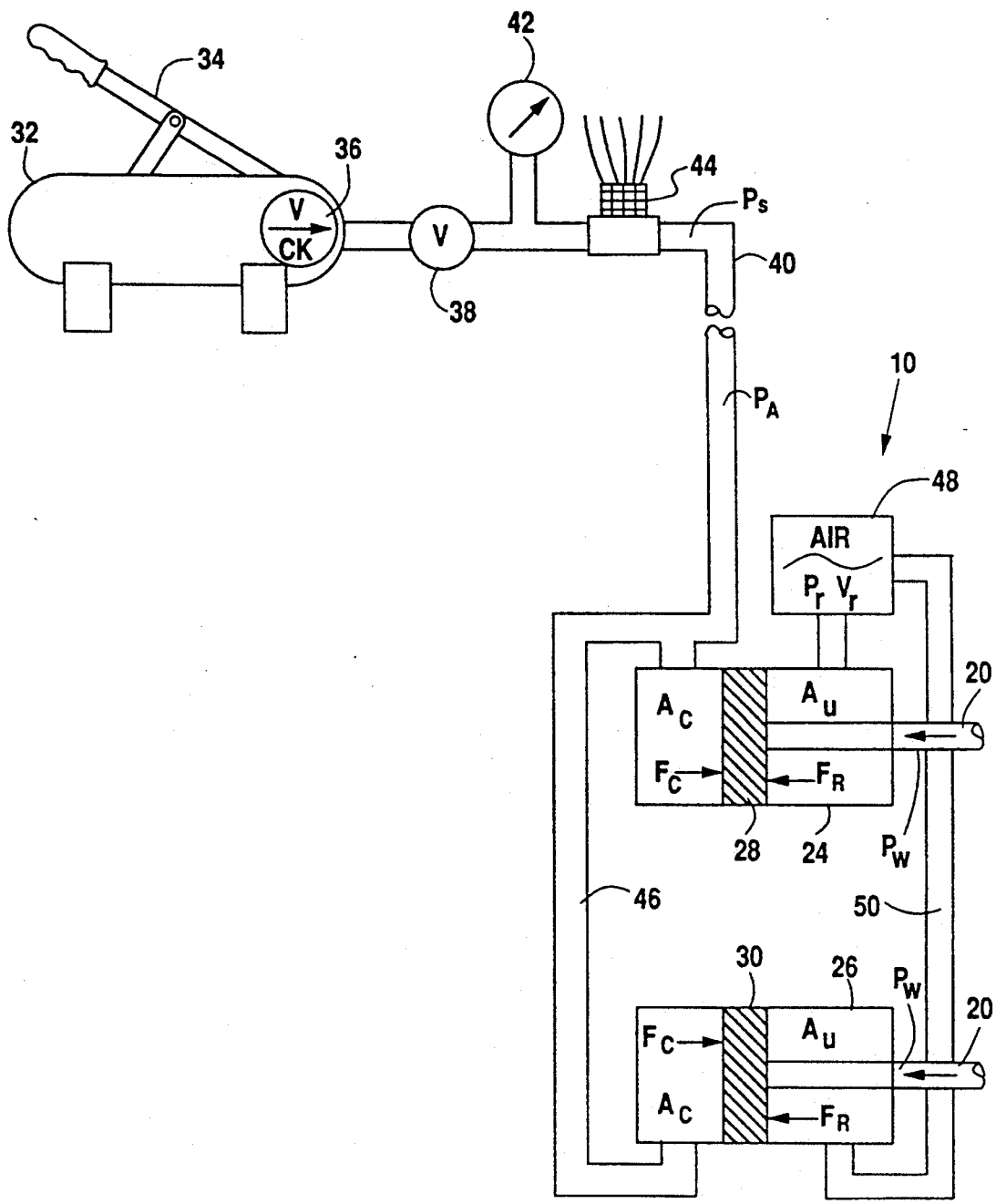
FIG. 3 is a pictorial illustration of the forces exerted on the three-component borehole wall-locking seismic detector in a shallow borehole.

Before finishing a detailed description of FIGS. 1 and 2, a generalized explanation of the operation of the forces exerted on the seismic detector (other than the vibrations being detected) will be appropriate. Referring to FIG. 3, a manually operated fluid pump and pressure tank 32 is pictorially illustrated for delivering hydraulic fluid under pressure to the seismic detector 10. By operation of the pump handle 34 on the pressure tank 32, hydraulic fluid is forced through check valve 36 and flow control valve 38 into hydraulic line 40. Pressure gauge 42 continues to monitor the pressure in hydraulic line 40. Manifold 44 allows the electrical circuits to connect into the hydraulic line 40 and be carried inside thereof to the seismic detector 10. The pressure at the surface is represented by the symbol $P_S$.

In the borehole where the seismic detector is located, pressure $P_a$, which is approximately the same as the surface pressure $P_s$, plus any hydraulic fluid head pressure, is received by the seismic detector 10. Within the seismic detector 10, the hydraulic fluid is delivered by conduits 46 to the backside of each of the hydraulic cylinders 24 and 26. The hydraulic fluid delivered through conduit 46 exerts on pistons 28 and 30 a clamping force $F_c$ represented by the pressure $P_a$ of the hydraulic fluid times the surface area $A_c$ on the backside of the pistons 28 and 30.

Inside of the seismic detector 10 is a source of pressurized air 48 that feeds to the front side of the pistons 28 and 30 of the cylinders 24 and 26, respectively. The source of pressurized air can either pressurize the entire casing of the seismic detector or it can provide a separate source of pressurized air delivered through airline 50. The amount of force being exerted by the source of the pressurized air 48 on the front side of the pistons 28 and 30 depends on the surface area $A_u$, the pressure $P_r$, and the volume $V_r$ of the pressurized air 48. Also, if the seismic detector 10 is located in water, the water will exert a pressure $P_w$ times the cross-sectional area of the piston rods 20.

In a preferred embodiment, the source of pressurized air 48 exerts an unclamping pressure tending to move the pistons 28 and 30 to the left with a force represented by $F_r$. Normally, this force $F_r$ is continuous. Hydraulic pressure is delivered through conduit 46 to the cylinders 24 and 26 exerts a pressure $A_c$ on the pistons 28 and 30, respectively, to give a clamping force $F_c$. When the clamping force $F_c$ represented by $A_c$ times $P_h$ exerted on pistons 28 and 30 exceeds the force $F_r$ plus the force exerted by the water $P_w$, the piston rods 20 will be forced to the right by pistons 28 and 30. This forces the shoe 16 as shown in FIGS. 1 and 2 to be pressed against the side of the borehole 12.

Figure 4:
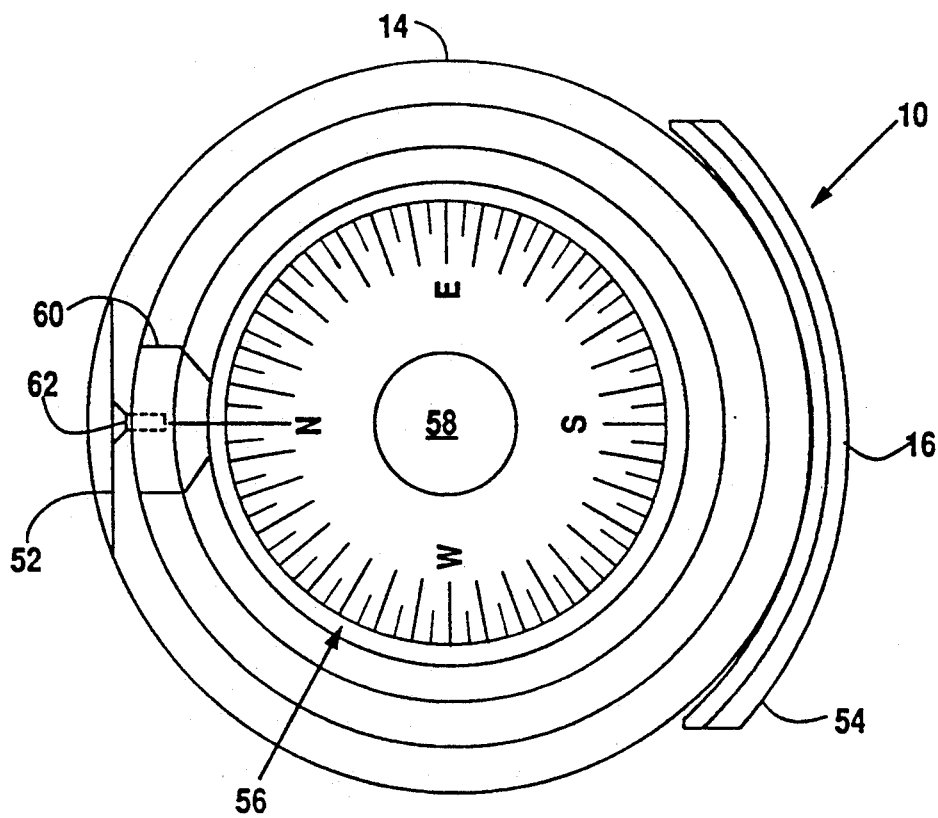
FIG. 4 is a bottom view of FIG. 1.

A bottom view of FIG. 1 is shown in FIG. 4. The cylindrical case 14 has a flat 52, longitudinally cut the length of the case 14. The purpose of the flat 52 is to firmly hold the seismic detector in position against the borehole 12 (see FIGS. 1 and 2) without rotating. By extending the shoe 16 (as shown in FIG. 2), the flat 52 is pushed against the opposite wall of the borehole 12, which flat 52 prevents the seismic detector 10 from rotating in the borehole 12.

The shoe 16, which extends essentially the full length of the seismic detector 10, has as large a circumferential sector area as practical. It has been found that a sector angle of approximately 120 degrees is about ideal for shoe 16 to give maximum surface contact with the borehole 12. As can be seen in FIG. 4, the external radius 54 of shoe 16 is approximately equal to the radius of the borehole 12, not the cylindrical case 14. Again, this is predetermined by the size of the borehole 12 to insure maximum surface contact between the shoe 16 and the borehole 12.

Located on the bottom of the seismic detector 10 is a compass 56 that may be rotated by rotating the knob 58.

The 'O'-ring seal 98 and metal bearing rings 102 and 104 on the bottom end plate 100 allow compass mount 56 to be rotated relative to accelerometer block 22 in the overall detector probe 10. Typically, in a field the operator would determine at the surface the magnetic bearing angle between the borehole 12 where the seismic detector 10 is to be located and the position where the seismic source vibration is going to be induced into the earth's surface by dynamite charge, thumper, or other means. The operator then sets the angle on the orientation compass 56 reference dial so that the accelerometer block 22 is arranged with the horizontal plane accelerometers 64 and 65 being at a roughly 45 degree angle to the incoming signal. The main objective is to insure that the incoming signal is not at 90 degrees to the accelerometer. Forty-five degrees is ideal.

Figure 5:
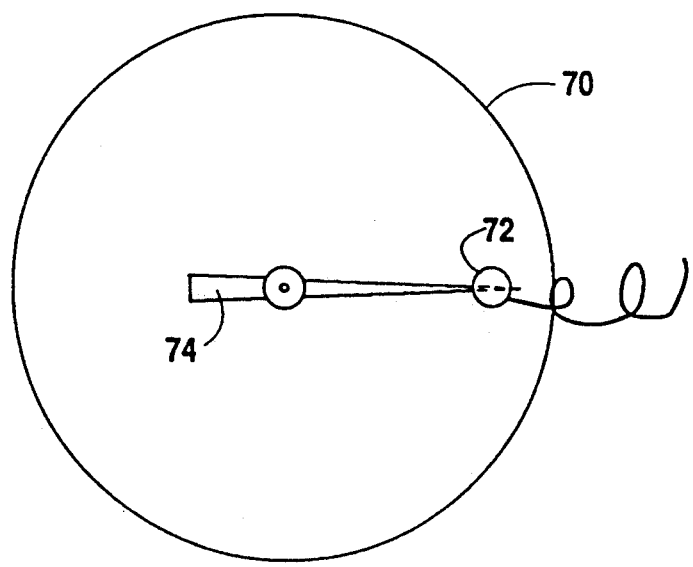
FIG. 5 is an internal view of the compass needle illustrating interruption of a light sensitive device.

The compass 56 is mounted on end plate 100 which is free to on its 'O'-ring seal 98 by means of knob 58. (See FIGS. 1 and 2.) Rotating end plate 100 turns compass 56 and housing cover 68 relative to the accelerometer block 22. (See FIG. 5.) Carried with the end plate 100 is a photocell 72. The compass needle 74, which is a magnetically activated compass needle, will pass through and interrupt the light incident on the photocell when the preset angle has been reached. To protect the operation of compass 56, the needle 74 and base plate 70 are contained in housing 68.

The electrical circuits from the surface connect through manifold 44 to the inside of the hydraulic line 40. (See FIG. 3) The electrical circuits then continue down through the hydraulic line 40 through the top end 76 of the cylindrical case 14. (See FIGS. 1 and 2) The top end 76 is held in place by top clip ring 78 and inside top clip ring 80. Between clip rings 78 and 80, the top end has top plate 82, bottom plate 84, with seal plate 86 located therebetween. The seal plate 86 has O-ring seals to maintain air pressure inside of seismic detector 10.

Hydraulic line 40 connects through top end 76 by means of manifold 88, which has O-ring seal 90 located between the manifold 88 and the seal plate 86. Internally, the electrical circuits 92 connect to the electrical components such as the accelerometers 64, internal vibrator 66 and photocell 72. The hydraulic line 40 connects to hydraulic cylinders 24 and 26 via conduit 106 and connectors 108 and 110.

Also in the seismic detector 10, there is shown a pressure valve 94 connected through top plate 76 by passage 96 to the inside of seismic detector 10. When the seismic detector 10 is on the surface, pressurized air is applied through pressure valve 94 and passage 96 to pressurize the internal volume of the seismic detector 10. The internal pressurized air $P_r$ provides force $F_r$ via valves 112 (see FIG. 3) to return pistons 28 and 30 to their unclamped position, thereby drawing the shoe 16 adjacent to the cylindrical case 14 as illustrated in FIG. 1.

The bottom end 100 of the seismic detector 10 is rotatable with the compass 56 as previously described. O-ring seals 98 maintains a pressure tight relationship between the bottom end 100 the cylindrical case 14. The bottom end 100 is held in place by outside bottom clip ring 102 and inside bottom clip ring 104.

When the seismic detector 10 is first placed in the borehole 12, the hydraulic wall-locking mechanism is activated to clamp the detector against borehole 12. Internal vibrator 66 is then temporarily activated to excite the clamped detector 10. The response of the three accelerometer sensors 64, 65, and 66 are monitor to assess the overall vibration characteristic of the detector 10 when clamped in place. The sensor responses observed in this test can reveal whether or not the borehole clamping condition is proper for high-quality seismic measurements.

METHOD OF OPERATION

A typical illustration of how the seismic detector 10 can be used may be helpful. The borehole 12 is drilled in the earth's surface to the desired depth. The shoe 16 is checked to insure that it has approximately the same radius as the borehole 12. Next, the angle between the borehole and where the vibrational source will be located is roughly determined. Then the magnetic bearing angle between detector borehole 12 and the source of the seismic energy is set on detector azimuth orientation compass 56 using knob 58 so that the angle is not perpendicular to either the X-axis or Y-axis sensors 64 or 65 with the best angle being approximately 45 degrees.

The seismic detector 10 is then lowered into the borehole 12 by the torque-rigid hydraulic line 40. After the seismic detector is lowered to the desired depth, the torque-rigid hydraulic hose 40 is rotated until the photocell 70 sends a signal indicating that seismic detector 10 is at the desired angle with respect to the seismic source location. By applying hydraulic pressure to the backside of the pistons 28 and 30, the shoe 16 is forced outward to clamp against the borehole wall. When a rigid clamp is achieved, the internal vibrator 66 is temporarily activated to test and evaluate the borehole clamping condition. Next, the seismic source is activated (whether dynamite charge, thumping machine, etc.) to generate a seismic signal in the geologic formations. Seismic signals in the formations surrounding detector borehole 12 excite the entire rigidly clamped detector 10. These vibrations are measured by the accelerometers 64, 65, and 67 contained in the accelerometer block 22.

After the desired measurements have been made, the hydraulic pressure is released at the surface as can be determined by the pressure gauge 42. The source of pressurized air 48 retracts the shoe 16 back to the cylinder case 14 by applying a back pressure on pistons 28 and 30. Then, for example, the seismic detector can be removed from the borehole 12 and moved to another borehole.

The materials used to construct the seismic detector 10 are selected so that the seismic detector 10 will have a mass density approximately equal to that of the geological formation in which it is to be located. Typically, the formation density is approximately 2.5 times the density of water. For example, the cylindrical case 14 or the shoe 16 may be made from any number of suitable materials, but they are selected from a material which in combination with the entire seismic detector 10 yields the desired mass density ratio. The same determining factor is used in selecting the other component parts of the seismic detector 10.

Thus, the weight of seismic detector 10 divided by its displacement volume when immersed in water should be approximately 2.5 times the weight of the displaced volume of water. For example, an experimental model of seismic detector 10 was constructed to have a cylindrical shape of 4.5" in diameter, not including the external clamping shoe and 12.5" in length and was closed on both ends. It had a weight of 17.5 lbs. These values yield a displacement volume of 199 cubic inches and a mass density of 17.5 divided by 199=0.0879 lbs. per cubic inch. The mass density of water is 0.0361 lbs. per cubic inch and hence the average mass density of the experimental seismic detector was 2.43 times that of water; a value very close to the typical value of 2.5. The component materials comprising this experimental detector were selected and sized to achieve the desired weight and external dimensions when assembled. The particular components used in this design included three piezoelectric accelerometers 64, 65, and 67, PVC plastic accelerometer block 22, air or hydraulic actuator cylinders 24 and 26 made of aluminum and containing stainless steel pistons 28 and 30, the PVC plastic cylindrical seismic detector case 14, PVC plastic end plates 76 and 100, nylon tubing and stainless steel tubular air or hydraulic couplings typified by 106, 108, 110, and 112, a piezoelectric detector test vibrator 66, a plastic shell compass 68, and optical sensor 72, and several rubber O-ring seals typified by 86, 90, and 98. The remaining internal volume within the detector case 14 is a void which is pressurized with air to provide the "air spring" drive force on the cylindrical actuators 24 and 26 by which the clamping shoe 16 is retracted. Clamping shoe 16 is made of aluminum, a material whose density is 2.7 times that of water and which is a value close to the desired average value for the seismic detector. The weight of these components of approximately 17.5 lbs. and a dimensional constraint that required the seismic detector to fit into boreholes of 6" diameter or larger provided the basis by which the diameter of 4.5" and the length of 12.5" of the seismic detector case 14 were determined in order to achieve the desired average density of 0.0879 lbs. per cubic inch.

By making the seismic detector 10 small and lightweight, a large clamping force to detector weight ratio can be generated. The typical clamping force to detector weight ratio obtainable with the detector 10 is about ten to one; substantially greater than that obtainable with conventional borehole seismic detectors.

By the use of the lighter weight seismic detector with lower concentrated stresses in the borehole, higher frequency seismic signals can be sensed with good fidelity resulting in higher resolution seismic measurements in the geologic formations under test. Also, the frequency range of the signals can be extended up to a high frequency limit of about 2,000 hertz. The increased frequency range and sensitivity of the seismic detector allows for a much more accurate determination of the geological formation.

Detector 10 can be constructed very economically with relatively inexpensive parts. For example, the compass 56 can be almost as simple as a compass used by the typical recreational hiker.

While the seismic detector 10 has been described for use in shallow boreholes, it can also be used in deep formations. However, when used in deep formations, the source of pressurized hydraulic fluid may be located in the borehole along with the seismic detector 10. This would eliminate the need for a hydraulic line extending from the surface to the downhole seismic detector. Other methods of operating the hydraulic cylinders 24 and 26 can also be used when the detector is to be used in deep fluid-filled boreholes.

I claim:
1. A seismic detector for profiling a subterranean formation by detecting seismic signals within a given frequency range, the seismic signals being induced in the subterranean formation at distance from a cased or uncased borehole in which said seismic detector is located, said seismic detector comprising:

a generally cylindrical housing;

accelerometer means rigidly secured in said generally cylindrical housing;

a moveable shoe carried by said housing, said shoe having an extended position and a retracted position, said shoe having a generally cylindrical shape through an arc, said arc having an outer radius approximately equal to a radius of said borehole, said arc being approximately 120 degrees and having a radius center generally coincident with a radial center line for said cylindrical housing, the length of said shoe being close in length to said generally cylindrical housing;

actuating means in said housing for extending said shoe to said extended position and retracting said shoe to said retracted position, said extended position clamping said seismic detector in said borehole and said retracted position releasing said seismic detector from said borehole; and control circuit for controlling said seismic detector particularly said actuating means and said accelerometer means to measure said seismic signals;

wherein contact with said borehole is maximized during said extended position of said shoe to reduce concentrated clamping stresses at points of contact with said borehole, and wherein said seismic detector is constructed of materials which in combination have a density that approximates that of said subterranean formation, the density matching providing a better transfer of said seismic signals to said seismic detector.

2. The seismic detector for profiling a subterranean formation as given in claim 1 wherein the clamping force is numerically approximately ten times the weight of said seismic detector.

3. The seismic detector for profiling a subterranean formation as given in claim 1 where in said actuating means includes at least two fluid cylinders with pistons therein connected to said shoe, a first pressured fluid on a first side of said pistons extending said shoe to said extended position, a second pressure fluid on a second side of said pistons retracting said shoe to said retracted position.

4. The seismic detector for profiling a subterranean formation as given in claim 2 further including a compass attached to said cylindrical housing, said compass having indicator means to determine via said control circuit the angle of orientation of said seismic detector when located in said borehole, and means for orienting said seismic detector from the surface.

5. The seismic detector for profiling a subterranean formation as given in claim 4 wherein said actuating means includes:

a pair of hydraulic cylinders secured inside said housing;

first source of pressurized fluid being delivered via a torque resistant hose to a first side of pistons in said pair of hydraulic cylinders for moving said pistons and hence said shoe to said extended position;

second source of pressurized fluid being delivered to a second side of said pistons for moving said pistons and hence said shoe to said retracted position;

said torque resistant hose being used to orient said seismic detector.

6. The seismic detector for profiling a subterranean formation as given in claim 5 wherein said indicator means is a photosensor that gives a signal when interrupted by a needle of said compass to indicate a present angle of orientation.

7. The seismic detector for profiling a subterranean formation as given in claim 6 wherein said housing has a longitudinal flat surface opposite said shoe to prevent rotation of said seismic detector when said shoe is in said extended position.

8. A method of profiling a subterranean formation with a seismic detector in a borehole within a given frequency range comprising steps of:

selecting said seismic detector to have a density that matches that of said subterranean formation;

maximizing the clamping surface area of a shoe and a housing of said seismic detector to minimize clamping stress in said subterranean formation by said shoe having an arc of approximately 120 degrees and a radius generally the same as said borehole;

locating said seismic detector in said borehole;

clamping said seismic detector in said borehole;

providing seismic source signals to be detected;

detecting said seismic source signals with accelerometers in said seismic detector; wherein the clamping force of said seismic detector being several times the weight of said seismic detector; the combination of said steps of selecting a matching density and maximizing clamping surface area while said clamping force being numerically several times said weight gives a maximum response to said detected seismic source signals in said subterranean formation with a minimum loss or distortion of said seismic source signals thereby allowing said given frequency range to be broader and said detecting more accurate.

9. The method of profiling a subterranean formation as given in claim 8 wherein said clamping force is up to ten times said weight of said seismic detector.

10. The method of profiling a subterranean formation as given in claim 8 including before said locating step setting the angle on a compass located in said seismic detector to avoid 90 degree angles between accelerometers in said seismic detector and direction of said seismic source signals detected by said detector followed thereafter by said locating step orienting said seismic detector in said borehole at said set angle.

* * * * *